US011954424B2

(12) United States Patent
Samulowitz et al.

(10) Patent No.: US 11,954,424 B2
(45) Date of Patent: Apr. 9, 2024

(54) AUTOMATIC DOMAIN ANNOTATION OF STRUCTURED DATA

(71) Applicant: INTERNATIONAL BUSINESS MACHINES CORPORATION, Armonk, NY (US)

(72) Inventors: Horst Cornelius Samulowitz, Armonk, NY (US); Kavitha Srinivas, Port Chester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/661,619

(22) Filed: May 2, 2022

(65) Prior Publication Data

US 2023/0351101 A1     Nov. 2, 2023

(51) Int. Cl.
*G06F 17/00* (2019.01)
*G06F 16/245* (2019.01)
*G06F 40/117* (2020.01)
*G06F 40/169* (2020.01)
*G06F 40/177* (2020.01)
*G06F 40/20* (2020.01)

(52) U.S. Cl.
CPC .......... *G06F 40/169* (2020.01); *G06F 16/245* (2019.01); *G06F 40/117* (2020.01); *G06F 40/177* (2020.01); *G06F 40/20* (2020.01)

(58) Field of Classification Search
CPC .... G06F 40/169; G06F 16/245; G06F 40/117; G06F 40/177; G06F 40/20
See application file for complete search history.

(56) References Cited

U.S. PATENT DOCUMENTS

| 6,263,339 | B1 | 7/2001  | Hirsch     |
| 6,741,974 | B1 | 5/2004  | Harrison   |
| 6,965,902 | B1 | 11/2005 | Ghatate    |
| 7,530,054 | B2 | 5/2009  | Reimer     |
| 7,703,085 | B2 | 4/2010  | Poznanovic |

(Continued)

FOREIGN PATENT DOCUMENTS

| CN | 108334321 A | 7/2018 |
| CN | 110134848 A | 8/2019 |

(Continued)

OTHER PUBLICATIONS

Uren, Victoria, et al. "Semantic annotation for knowledge management: Requirements and a survey of the state of the art." Journal of Web Semantics 4.1 (2006): 14-28 (Year: 2006).*

(Continued)

*Primary Examiner* — Andrew T McIntosh
(74) *Attorney, Agent, or Firm* — Peter Suchecki

(57) ABSTRACT

A processor may receive structured data. The structured data may include one or more columns and associated column names. The processor may analyze the structured data. Analyzing the structured data may include gathering a requisite set of keywords from the associated column names across all columns and/or a sample of column cells. The processor may access a corpus of documents. Each of the documents in the corpus may be associated with a respective keyword. The processor may search the corpus of documents based on the requisite set of keywords. The processor may summarize one or more documents associated with the requisite set of keywords.

20 Claims, 5 Drawing Sheets

(56) References Cited

U.S. PATENT DOCUMENTS

| | | | |
|---|---|---|---|
| 7,984,422 | B2 | 7/2011 | Graham |
| 8,843,884 | B1 | 9/2014 | Koerner |
| 9,639,335 | B2 | 5/2017 | Hoban |
| 9,658,839 | B2 | 5/2017 | Hale |
| 9,959,326 | B2 | 5/2018 | Duan |
| 10,073,763 | B1 | 9/2018 | Raman |
| 10,229,200 | B2 | 3/2019 | Bornea |
| 10,303,448 | B2 | 5/2019 | Steven |
| 10,402,175 | B2 | 9/2019 | McFarland |
| 10,606,885 | B2 | 3/2020 | Brundage |
| 11,003,994 | B2 | 5/2021 | Liang |
| 2006/0294499 | A1 | 12/2006 | Shim |
| 2010/0175049 | A1 | 7/2010 | Ramsey |
| 2011/0202559 | A1 | 8/2011 | Stiers |
| 2013/0086547 | A1* | 4/2013 | Said ............... G06F 8/73 717/104 |
| 2017/0109933 | A1 | 4/2017 | Voorhees |
| 2017/0221153 | A1* | 8/2017 | Allbright ............ H03M 7/30 |
| 2017/0255536 | A1* | 9/2017 | Weissinger ......... G06Q 50/01 |
| 2019/0005163 | A1 | 1/2019 | Farrell |
| 2020/0110746 | A1 | 4/2020 | Lecue |
| 2020/0143243 | A1 | 5/2020 | Liang |
| 2020/0210478 | A1* | 7/2020 | Wada ............... G06F 16/908 |
| 2021/0064672 | A1* | 3/2021 | Mahadi ............. G06N 5/02 |
| 2021/0173641 | A1 | 6/2021 | Dolby |
| 2021/0326312 | A1 | 10/2021 | White |
| 2021/0342723 | A1* | 11/2021 | Rao ................ G06F 16/285 |

FOREIGN PATENT DOCUMENTS

| | | |
|---|---|---|
| CN | 110362596 A | 10/2019 |
| CN | 111091883 A | 5/2020 |
| CN | 111353005 A | 6/2020 |
| CN | 112287679 A | 1/2021 |
| KR | 101505546 B1 | 3/2015 |
| KR | 101762670 B1 | 8/2017 |

OTHER PUBLICATIONS

Taheriyan, Mohsen, et al. "Learning the semantics of structured data sources." Journal of Web Semantics 37 (2016): 152-169 (Year : 2016).*

Khurana, Udayan, and Sainyam Galhotra. "Semantic concept annotation for tabular data." Proceedings of the 30th ACM International Conference on Information & Knowledge Management. 2021 (Year: 2021).*

Grigoriu, et al., "SIENA: Semi-automatic Semantic Enhancement of Datasets Using Concept Recognition", Journal of Biomedical Semantics, vol. 12, Article No. 5, Mar. 24, 2021, 12 pgs., <https://doi.org/10.1186/s13326-021-00239-z>.

Huynh, et al., "Dagobah: Enhanced Scoring Algorithms for Scalable Annotations of Tabular Data", SEMTAB 2020, Semantic Web Challenge on Tabular Data to Knowledge Graph Matching (SemTab 2020), co-located with the 19th International Semantic Web Conference (ISWC 2020), Nov. 5, 2020, Athens, Greece (Virtual Conference), Nov. 5, 2020, 13 pgs.

Khurana, et al., "Semantic Annotation for Tabular Data", Dec. 15, 2020, 9 pgs., DOI: 10.48550/arxiv.2012.08594.

Mell et al., "The NIST Definition of Cloud Computing", National Institute of Standards and Technology, Special Publication 800-145, Sep. 2011, 7 pages.

Suhara, et al., "Annotating cols. with Pre-trained Language Models", Mar. 1, 2022, 15 pgs., arXiv:2104.01785.

"H20 AI Feature Store", Downloaded from the Internet on Oct. 26, 2022, 5 pgs., <https://h2o.ai/platform/ai-cloud/make/feature-store/>.

Agesen, et al., "Type Inference of Self: Analysis of Objects with Dynamic and Multiple Inheritance", ECOOP'93, Apr. 1993, 26 pgs.

Allamanis, et al., "A Survey of Machine Learning for Big Code and Naturalness", Abstract Only, ACM Computing Surveys (CSUR), Jul. 2018 • Article No. 81, 5 pgs., <https://doi.org/10.1145/3212695>.

Allamanis, et al., "Learning to Represent Programs with Graphs", Published as a conference paper at ICLR 2018, arXiv: 1711.00740v3 [cs.LG], May 4, 2018 , 17 pgs.

Alon, et al, "A General Path-Based Representation for Predicting Program Properties", arXiv:1803.09544v3 [cs.PL], Apr. 22, 2018, 16 pgs.

Alon, et al, "CODE2SEQ: Generating Sequences From Structured Representations of Code," CoRR, vol. abs/1808.01400, Feb. 21, 2019, 22 pgs.

Bichsel, et al., "Statistical Deobfuscation of Android Applications," in Proceedings of the 2016 ACM SIGSAC Conference on Computer and Communications Security, ser. CCS '16. New York, NY, USA: ACM, Oct. 24-28, 2016, 13 pgs.

Bruch, et al., "Learning from Examples to Improve Code Completion Systems", Proceedings of the the 7th Joint Meeting of the European Software Engineering Conference and the ACM SIGSOFT Symposium on The Foundations pf Software Engineering, ESEC/FSE '09, New York, NY, USA: ACM, 2009, 11 pgs.

Cambronero, et al., "wranglesearch: Mining Data Wrangling Functions from Python Programs [Under submission]", Downloaded from the Internet on May 21, 2022, 9 pgs., <https://www.josecambronero.com/publication/wranglesearch/wranglesearch/>.

Chae, et al., "Automatically Generating Features for Learning Program Analysis Heuristics for C-Like Languages", Proc. ACM Program. Lang. 1, OOPSLA, Article 101, Oct. 2017, 25 pgs.

Chambers, et al., "Iterative Type Analysis and Extended Message Splitting; Optimizing Dynamically-typed Object-oriented Programs", ACM SIGPLAN Notices, vol. 25, No. 6_ ACM, 1990, 15 pgs.

Chen, et al., "Learning Semantic Annotations for Tabular Data", Proceedings of the Twenty-Eighth International Joint Conference on Artificial Intelligence (IJCAI-19) May 30, 2019, 7 pgs.

Chen, et al., "Colnet: Embedding the Semantics of Web Tables for Column Type Prediction", The Thirty-Third AAAI Conference on Artificial Intelligence (AAAI-19), Nov. 4, 2018, 8 pages.

Cremaschi, et al., "MantisTable: an Automatic Approach for the Semantic Table Interpretation", Conference: SemTab 2019: Semantic Web Challenge on Tabular Data to Knowledge Graph Matching co-located with the 18th International Semantic Web Conference, Oct. 2019, 10 pgs.

Dolby, et al., "Mining Code Expressions for Data Analysis", U.S. Appl. No. 17/895,881, filed Aug. 25, 2022, 33 pgs.

Feldthaus, et al., "Efficient Construction of Approximate Call Graphs for JavaScript IDE Services", 35th International Conference on Software Engineering, ICSE '13, San Francisco, CA, USA, May 18-26, 2013, 2013, 10 pgs.

Fernandes, et al., "Structured Neural Summarization", ICLR 2019, arXiv:1811.01824, Feb. 20, 2019, 18 pgs.

Feurer, et al., "Using Meta-Learning to Initialize Bayesian Optimization of Hyperparameters", Proceedings of the 2014 International Conference on Meta-learning and Algorithm Selection—vol. 1201, MLAS'14. Aachen, Germany, 2014, 8 pgs.

Galhotra, et al., "Automated Feature Enhancement for Predictive Modeling using External Knowledge",2019 International Conference on Data Mining Workshops (ICDMW), Nov. 8-11, 2019, 4 pgs., doi: 10.1109/ICDMW.2019.00161.

Galhotra, et al., "Semantic Search over Structured Data", CIKM '20: Proceedings of the 29th ACM International Conference on Information & Knowledge Management, Oct. 2020, 4 pgs., <https://doi.org/10.1145/3340531.3417426>.

Hsiao, et al., "Reducing MapReduce Abstraction Costs for Text-Centric Applications", 2014 43rd International Conference on Parallel Processing, ICPP 2014, Minneapolis, MN, USA, Sep. 9-12, 2014, 10 pgs.

Hu, et al., "Codesum: Translate Program Language to Natural Language", Abstract Only, Computer Science, Software Engineering, arXiv:1708.01837, Jan. 31, 2018, 1 pg.

Hulsebos, et al., "Sherlock: A Deep Learning Approach to Semantic Data Type Detection", KDD '19, Aug. 4-8, 2019, Anchorage, AK, USA, 9 pgs.

Jimenez-Ruiz, et al.,"SemTab2019: Resources to Benchmark Tabular Data to Knowledge Graph Matching Systems;"European Semantic Web Conference, Springer 2020, 41 pgs.

(56) References Cited

OTHER PUBLICATIONS

Kanter, et al., "Deep feature synthesis: Towards automating data science endeavors", 2015 IEEE international conference on data science and advanced analytics (DSAA), IEEE, 2015, 10 pgs.
Katz, et al., "Explorekit: Automatic feature generation and selection", 2016 IEEE 16th International Conference on Data Mining (ICDM), IEEE, 2016, 6 pgs.
Khurana, et al., "Feature Engineering for Predictive Modeling Using Reinforcement Learning", The Thirty-Second AAAI Conference on Artificial Intelligence (AAAI-18), Sep. 21, 2017, 8 pgs.
Li, et al., "SySeVR: A Framework for Using Deep Learning to Detect Software Vulnerabilities", arXiv:1807.06756v2 [cs.LG], Sep. 21, 2018, 13 pgs.
Limaye, et al., "Annotating and searching web tables using entities, types and relationships", 36th International Conference on Very Large Data Bases, Sep. 13-17, 2010, Proceedings of the VLDB Endowment, vol. 3, No. 1, Singapore 10 pgs.
Morikawa, H., "Semantic Table Interpretation using LOD4ALL", SemTab@ ISWC, 2019, 8 pgs.
Namaki, et al., "Vamsa: Automated Provenance Tracking in Data Science Scripts," Research Track Paper, Aug. 23-27, 2020, Virtual Event, USA, 10 pgs.
Neumaier, et al., "Multi-level semantic labelling of numerical values", The Semantic Web—ISWC 2016. ISWC 2016. Lecture Notes in Computer Science, vol. 9981. Springer, Cham., 16 pgs. <https://doi.org/10.1007/978-3-319-46523-4_26>.
Nguyen, et al., "Graph-Based Mining of Multiple Object Usage Patterns", Abstract Only, Proceedings of the the 7th Joint Meeting of the European Software Engineering Conference and the ACM SIGSOFT Symposium on The Foundations of Software Engineering, ESEC/FSE '09. New York, NY, USA: ACM, Jan. 2009, 17 pgs. Available: http:l/doi.acm.org/10.1145/1595696.1595767 [Abstract Only].
Nguyen, et al., "Graph-based Statistical Language Model for Code," in Proceedings of the 37th International Conference on Software Engineering—vol. 1, ser. ICSE '15. Piscataway, Nj, USA: IEEE Press, 2015, 11 pgs.
Nguyen, et al., "MTab: Matching Tabular Data to Knowledge Graph using Probability Models", arXiv:1910.00246v1 [cs.AI], Oct. 1, 2019, 8 pgs.
Oliveira, et al., "ADOG-Annotating Data with Ontologies and Graphs", In SemTab@ ISWC, 2019, 6 pgs.
Olson, et al., "Evaluation of a Tree-based Pipeline Optimization Tool for Automating Data Science", Proceedings of the Genetic and Evolutionary Computation Conference 2016, 13ECCO '16. New York, NY, USA: ACM, Mar. 20, 2016, 8 pgs.
Ota, et al., "Data Driven Domain Discovery for Structured Datasets", Proceedings of the VLDB Endowment, vol. 13, No. 7, Sep. 2020, 13 pgs.
Proksch, et al., "Intelligent Code Completion with Bayesian Networks", Abstract Only, ACM Transactions on Software Engineering and Methodology (TOSEM), Dec. 2015, Article No. 3, 5 pgs., <https://doi.org/10.1145/2744200>.
Ritze, et al., "Matching HTML tables to DBpedia", Proceedings of the 5th International Conference on Web Intelligence, Mining and Semantics, Article 10, Jul. 2015, 6 pgs.
Samulowitz, et al., "Data Augmentation Using Semantic Transforms", U.S. Appl. No. 18/051,900, filed Nov. 2, 2022, 29 pgs.
Shivers, O., "Control-Flow Analysis of Higher-Order Languages: or Taming Lambda", May 1991, CMU-CS-91-145, 200 pgs.
Song, H., "Autofe: efficient and robust automated feature engineering", Massachusetts Institute of Technology, Jun. 2018, 61 pgs.
Srinivas, et al., "Semantic Feature Discovery with Code Mining and Semantic Type Detection", Jun. 28, 2022, 3 pgs.
White, et al., "Deep Learning Code Fragments for Code Clone Detection", Proceedings of the 31st IEEE/ACM International Conference on Automated Software Engineering, ASE Sep. 2016, New York, NY, USA, 12 pgs.
Yan, et al., "Synthesizing Type-Detection Logic for Rich Semantic Data Types using Open-source Code", SIGMOD'18, Jun. 10-15, 2018, 16 pgs.
Yu, et al., "Deep Code Curator—Technical Report on Code2Graph", CECS Technical Report TR# 19-01, University of California, Irvine, Apr. 21, 2019, 33 pgs.
Zhang, et al., "Sato: Contextual Semantic Type Detection in Tables", Proceedings of the VLDB Endowment, vol. 13, No. 11, 2020, DOI: https://doi.org/10.14778/3407790.3407793, 14 pgs.
Appendix P—List of IBM Patents or Patent Applications Treated as Related, Filed herewith, 2 Pages.

* cited by examiner

AUTOMATIC DOMAIN ANNOTATION OF STRUCTURED DATA

BACKGROUND

The present disclosure relates generally to the field of data classification, and more specifically to automatically annotating structured data with domain specific tags.

Structured data such as that found in CSV files, JSON files, etc. have names of attributes or columns, but it is often unclear what a dataset in/of the structured data is about. Typically, even a broad domain of a dataset is not even available.

SUMMARY

Embodiments of the present disclosure include a method, computer program product, and system for automatically annotating structured data with domain specific tags. A processor may receive structured data. The structured data may include one or more columns and associated column names. The processor may analyze the structured data. Analyzing the structured data may include gathering a requisite set of keywords from the associated column names across all columns. The processor may access a corpus of documents. Each of the documents in the corpus may be associated with a respective keyword. The processor may search the corpus of documents based on the requisite set of keywords. The processor may summarize one or more documents associated with the requisite set of keywords.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
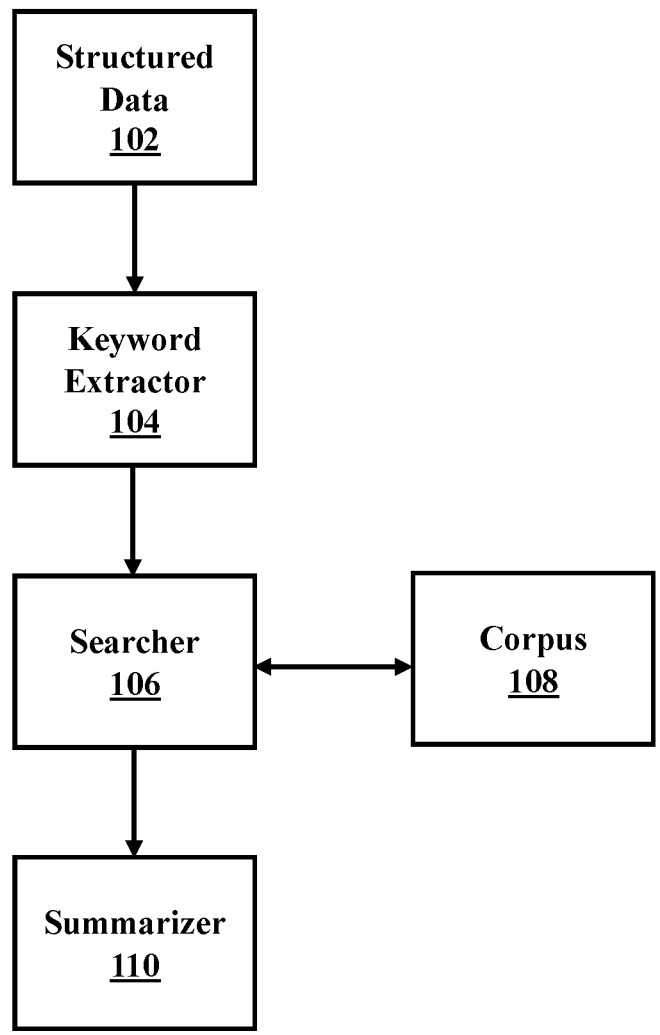
FIG. 1 illustrates a block diagram of an example system for automatically annotating structured data with domain specific tags, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of data classification, and more specifically to automatically annotating structured data with domain specific tags. While the present disclosure is not necessarily limited to such applications, various aspects of the disclosure may be appreciated through a discussion of various examples using this context.

Structured data (which may be associated with and/or, may include, one or more datasets) such as that found in CSV files, JSON files, etc. have names of attributes or columns, but it is often unclear what a dataset in/of the structured data is about. Typically, even a broad domain of a dataset is not even available. However, understanding even the broad domain of a dataset is extremely useful in not only helping users understand the data, but building recommendation systems on what users can do with the data (e.g., machine learning), and building automated systems that can fill in parts of what users want to do with the data (e.g., automatic artificial intelligent [AI] pipelines).

Accordingly, disclosed herein as a proposed solution (method, system, and/or computer program product) for automatically annotating structured data with domain specific tags. In some embodiments, structured data often has key anchor text that are clues about the data, such as, column names, frequently occurring text in cells (e.g., a location such as New York, a product name/number, etc.), etc. In such an embodiment, the proposed solution (by way of a processor) harnesses/performs a text search over a large relevant corpus of documents (e.g., medical paper, warehouse logs, the Web, etc.) to fetch relevant documents for/associated with the structured data. Additionally, the proposed solution may summarize the fetched relevant documents in the form of topic extraction/word clouds, etc., and display/present the summarization to a user.

Referring now to FIG. 1, illustrated is a block diagram of an example system 100 for automatically annotating structured data with domain specific tags, in accordance with aspects of the present disclosure. As depicted, the system 100 includes structured data 102, a keyword extractor 104, a searcher 106, a corpus 108, and a summarizer 110.

In some embodiments, the structured data 102 may be presented in a table (e.g. column/row) format, for example as depicted directly below.

| State | Confirmed | Recovered |
|---|---|---|
| Alabama | 200 | 9000 |
| Alaska | 100 | 2000 |
| ... | ... | ... |
| Wyoming | 150 | 2000 |

In some embodiments, the structured data 102 is sent/forwarded to, and/or, analyzed/processed by the keyword extractor 104. The keyword extractor 104 analyzes the structured data 102 to gather a requisite set of keywords from the column names (e.g., state, confirmed, and recovered) across all columns in a dataset. In such embodiments, this may be described as keyword extraction. In some embodiments, the keyword extractor 104 uses techniques such as term frequency-inverse document frequency (TF/

IDF) over a large corpus of structured tables to identify useful keywords (e.g., state, confirmed, and recovered).

In some embodiments, the keyword extractor 104 communicates with the searcher 106 which utilizes the keywords to perform a keyword search to extract/find/recover relevant documents over/across/within a corpus (of documents), such as the corpus 108. As depicted, the searcher 106 communicates with the corpus 108 (which may be the Web) and searches the corpus 108 with a keyword query (e.g., state, confirmed, and recovered).

In some embodiments, the extracted/found/recovered relevant documents are provided to the summarizer 110 that performs a summarization over the relevant documents to extract concepts/tags that specify domain(s) of the relevant documents. In some embodiments, extracted topics, keywords, etc. are mapped to categories or concepts in knowledge graphs or linked information pages (e.g., weblinks to reference pages, particular articles, etc.) and such mapping is a summary generated/provided by the summarizer 110. In some embodiments, the summarizer 110 generates/provides a summary of the relevant topic to a user and/or generates a summary to extract domain tags, which can then be used to classify datasets/the structured data 102.

For example, from finding, by the searcher 106, relevant documents based on "state, confirmed, and recovered," the summarizer 110 can deduce that the majority of relevant documents are related to COVID-19 and the structured data 102 is now/can now be tagged with a COVID-19 domain tag.

In some embodiments, keyword extraction, by the keyword extractor 104, from columns is based on filtering techniques in the case of a large number of columns (e.g., a threshold number of columns is exceeded, such as >1,000, >10,000, etc.). In some embodiments, the summarization process by the summarizer 100 include techniques such as topic extraction, extractive summarization, and/or information retrieval techniques such as TF/IDF.

In some embodiments, the domain annotation for/of the structured data 102 is used for overall data understanding, the finding/retrieval of similar datasets, and/or the finding of relevant code that manipulates similar datasets (e.g., data of this domain type is generally extrapolated utilizing one type of method, whereas another domain type is extrapolated by another, data of this domain type is processed with this function, etc.).

It is noted that typical solutions for annotations of structured data/datasets are either focused on column to concept extraction, focused on subparts of tabular data that requires knowledge graphs to be used as concepts, do not attempt domain annotation of a whole table, or require supervision and trained models. The proposed solution of system 100 however, uses text search to tag domains and is not solely focused on column to concept extraction, not focused on subparts of tabular data that require knowledge graphs to be used as concepts, provides domain annotation of a whole table, and does not require supervision and trained models.

Figure 2:
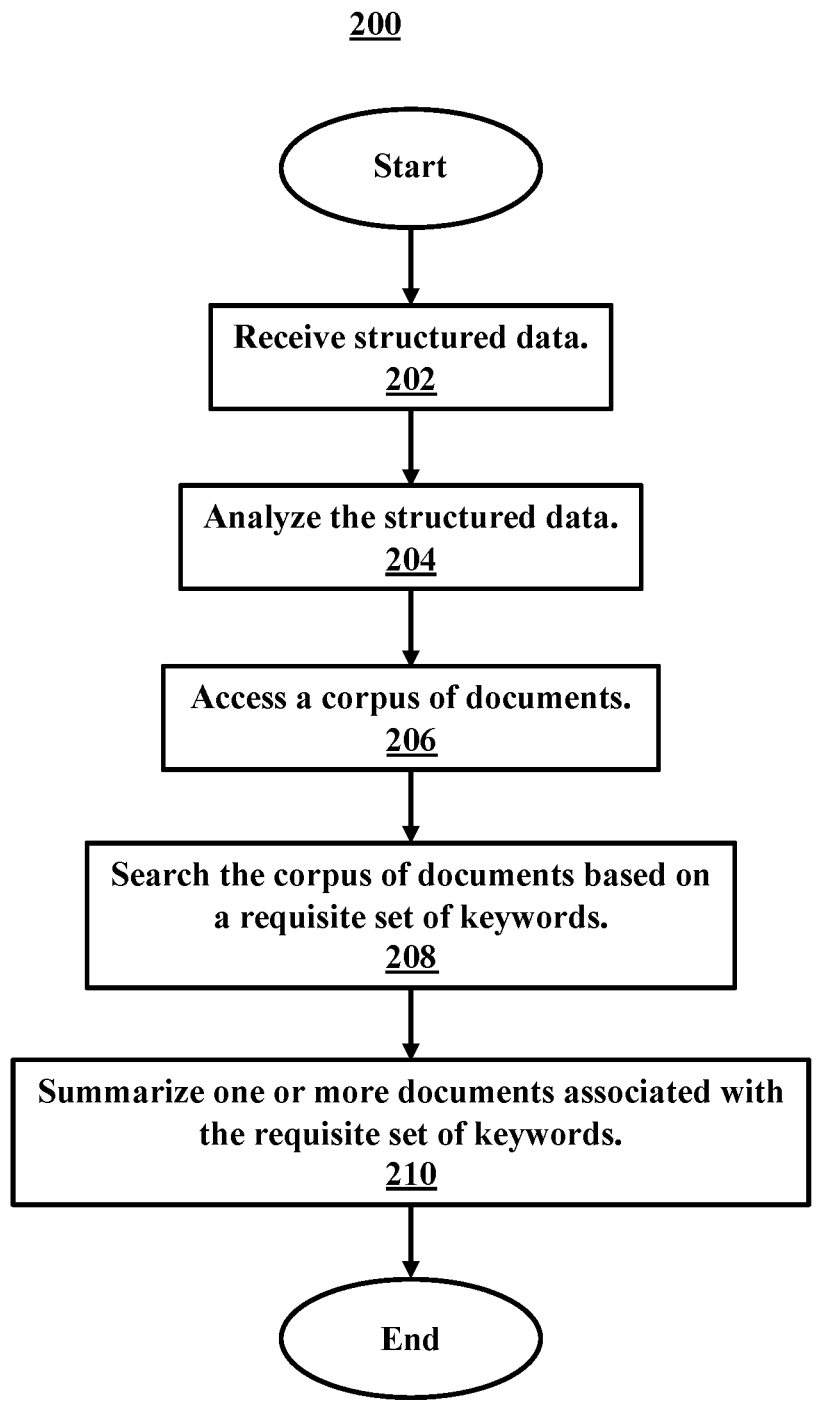
FIG. 2 illustrates a flowchart of an example method for automatically annotating structured data with domain specific tags, in accordance with aspects of the present disclosure.

Referring now to FIG. 2, illustrated is a flowchart of an example method 200 for automatically annotating structured data with domain specific tags, in accordance with aspects of the present disclosure. In some embodiments, the method 200 may be performed by a processor (e.g., of the system 100 of FIG. 1, etc.).

In some embodiments, the method 200 begins at operation 202 where the processor receives structured data. In such an embodiment, the structured data may include one or more columns and associated column names. In some embodiments, the method 200 proceeds to operation 204, where the processor analyzes the structured data. In such an embodiment, analyzing the structured data may include gathering a requisite set of keywords from the associated column names across all columns and/or a sample of column cells (e.g., a selection of cells from across all columns, such as title cells for the columns, etc.).

In some embodiments, the method 200 proceeds to operation 206, where the processor accesses a corpus of documents. In such an embodiment, each of the documents in the corpus may be associated with a respective keyword (e.g., label, header, title, etc.). In some embodiments, the method 200 proceeds to operation 208, where the processor searches the corpus of documents based on the requisite set of keywords (e.g., using the keywords as a query). In some embodiments, the method 200 proceeds to operation 210, where the processor summarizes one or more documents associated with the requisite set of keywords. In some embodiments, after operation 210, the method 200 may end.

In some embodiments, discussed below, there are one or more operations of the method 200 not depicted for the sake of brevity and which are discussed throughout this disclosure. Accordingly, in some embodiments, the processor may further select the one or more documents in the corpus based on a respective keyword matching at least one requisite keyword from the requisite set of keywords. For example, keywords of: apples, oranges, bananas are extracted as requisite key words from structured data. The processor may then search the corpus for documents that include the same keywords. In some embodiments the keywords associated with the documents in the corpus may be tags/annotations themselves. In some embodiments, the processor may search the requisite keywords with sub-keywords in order to more concisely search the corpus. Furthering the example, apples, oranges, and bananas could be searched with another indicator such as: quantity, which indicates to the processor that the objects: apples, oranges, and bananas are in the structured data along with numerical values associated. Such an indicator may limit the search to just supply chain documents.

In some embodiments, the gathering the requisite set of keywords from the associated column names across all columns is based on one or more filtering techniques when the number of the one or more columns is above a threshold number of columns. In some embodiments, summarizing the one or more documents includes the processor extracting tags from the one or more documents that specify a domain of the one or more documents. For example, relevant documents that were retrieved for summarization may also have their tags identified and extracted. Such extracted tags can then be automatically applied/annotated to datasets/data/etc. of the structured data.

In some embodiments, summarizing the one or more documents further includes the processor performing a topic extraction, an extractive summarization, and an information retrieval action (e.g., TD/IDF, etc.). In some embodiments, the processor may further tag the structured data with a specific domain as based on the domain of the one or more (relevant/selected/associated/etc.) documents. For example, relevant documents that are selected may each contain a tag of "cookies" and the structured data may not have that tag, accordingly, the processor automatically applies the tag of "cookies" to the structured data (or a portion [datum/dataset/etc.] of the structured data). That is, structured data is given a domain annotation/tag/indicator/etc. based on documents it could be related to/associated with.

In some embodiments, the processor may further analyze one or more datasets (e.g. other datasets of the structured data, of other structured data, etc.). The processor may identify that at least one dataset of the one or more datasets is associated with the specific domain. The processor may provide relevant code (based on the specific domain) that manipulates the at least one dataset.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
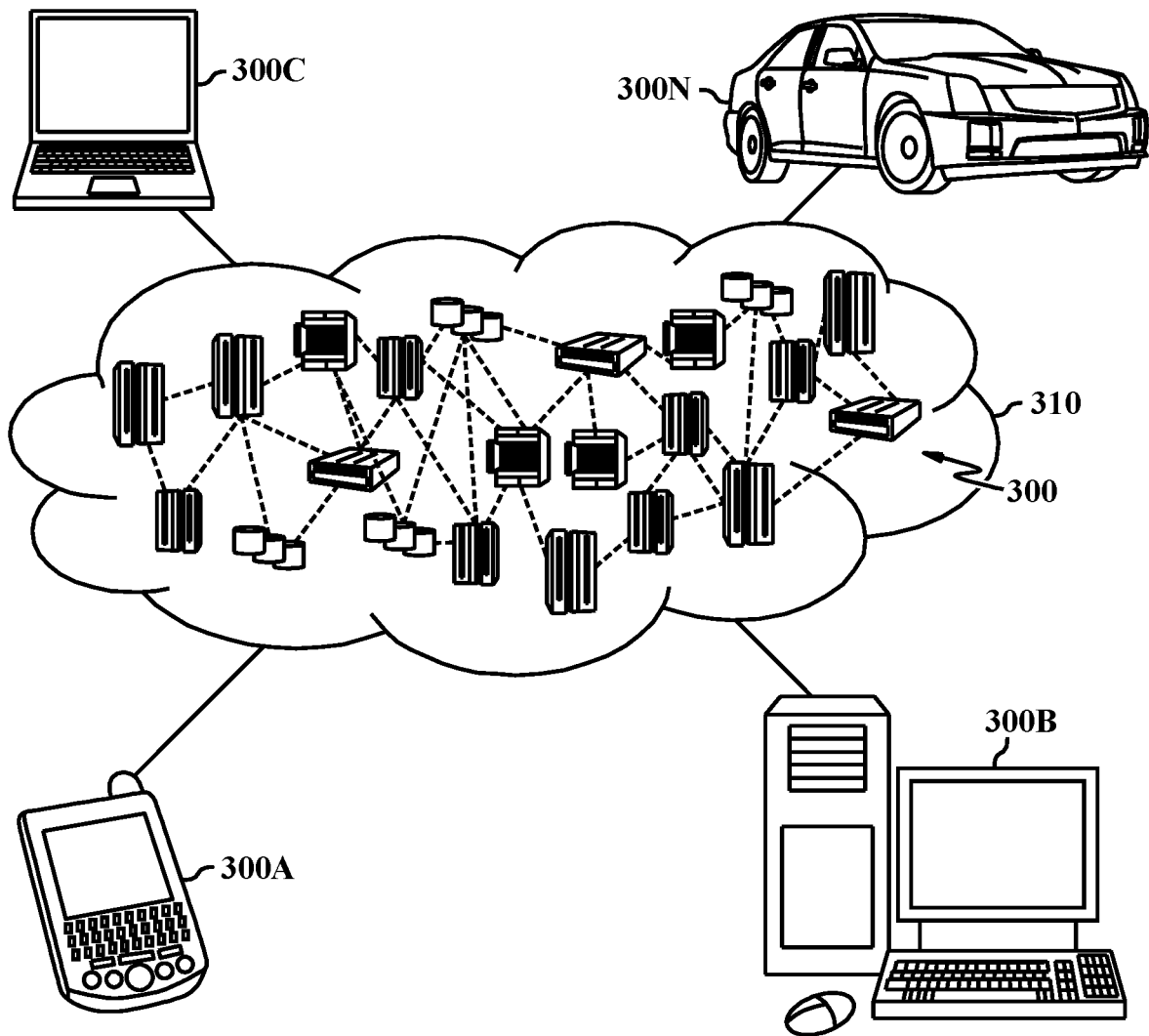
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
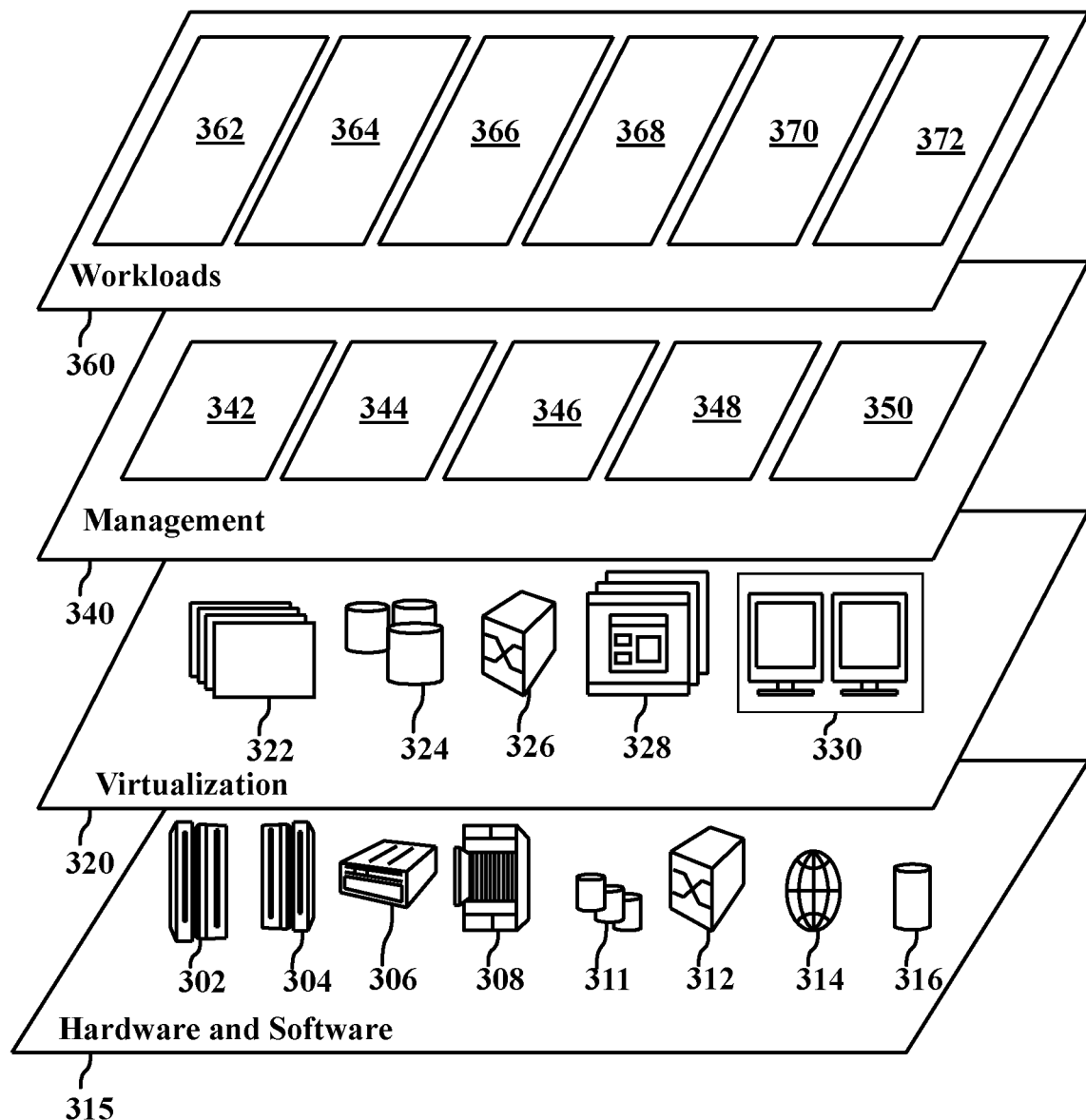
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and automatically annotating structured data with domain specific tags 372.

Figure 4:
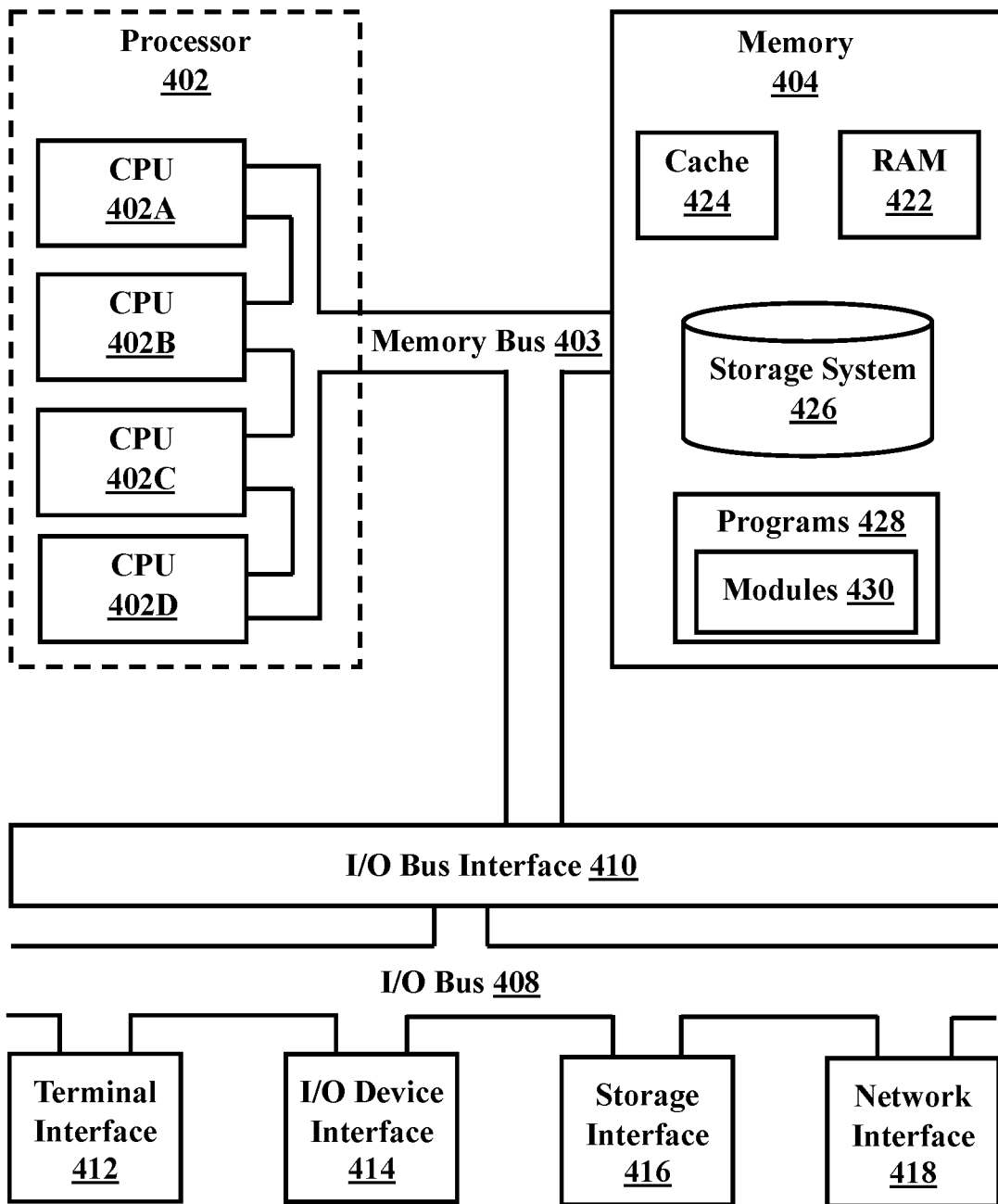
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for automatically annotating structured data with domain specific tags, the system comprising:
   a memory; and
   a processor in communication with the memory, the processor being configured to perform operations comprising:
   receiving structured data, wherein the structured data includes one or more columns and associated column names;
   analyzing the structured data, wherein analyzing the structured data includes gathering a requisite set of keywords from the associated column names across all columns and/or a sample of column cells;
   accessing a corpus of documents, wherein each of the documents in the corpus are associated with a respective keyword;
   searching the corpus of documents based on one or more sub-keywords configured to narrow the searching of the corpus of documents, wherein the one or more sub-keywords are based on a search of the requisite set of keywords;
   summarizing one or more documents, wherein summarizing the one or more documents includes mapping a knowledge graph and linked information pages associated with the requisite set of keywords; and
   classifying, based on the summarized one or more documents, the structured data with a specific domain.

2. The system of claim 1, wherein the processor is further configured to perform operations comprising:
   selecting the one or more documents in the corpus based on a respective keyword matching at least one requisite keyword from the requisite set of keywords.

3. The system of claim 1, wherein gathering the requisite set of keywords from the associated column names across all columns is based on one or more filtering techniques when the number of the one or more columns is above a threshold number of columns.

4. The system of claim 1, wherein summarizing the one or more documents includes:
   extracting tags from the one or more documents that specify a domain of the one or more documents.

5. The system of claim 4, wherein summarizing the one or more documents further includes:
   performing a topic extraction, an extractive summarization, and an information retrieval action.

6. The system of claim 5, wherein the processor is further configured to perform operations comprising:
   tagging the structured data with a specific domain as based on the domain of the one or more documents.

7. The system of claim 6, wherein the processor is further configured to perform operations comprising:
   analyzing one or more datasets;
   identifying that at least one dataset of the one or more datasets is associated with the specific domain; and
   providing relevant code that manipulates the at least one dataset, wherein the relevant code manipulates the at least one dataset by processing the at least one dataset with a function associated with the specific domain.

8. A computer-implemented method for automatically annotating structured data with domain specific tags, the method comprising:
   receiving, by a processor, structured data, wherein the structured data includes one or more columns and associated column names;
   analyzing the structured data, wherein analyzing the structured data includes gathering a requisite set of keywords from the associated column names across all columns and/or a sample of column cells;
   accessing a corpus of documents, wherein each of the documents in the corpus are associated with a respective keyword;
   searching the corpus of documents based on one or more sub-keywords configured to narrow the searching of the corpus of documents, wherein the one or more sub-keywords are based on a search of the requisite set of keywords;
   summarizing one or more documents, wherein summarizing the one or more documents includes mapping a knowledge graph and linked information pages associated with the requisite set of keywords; and
   classifying, based on the summarized one or more documents, the structured data with a specific domain.

9. The computer-implemented method of claim 8, further comprising:
   selecting the one or more documents in the corpus based on a respective keyword matching at least one requisite keyword from the requisite set of keywords.

10. The computer-implemented method of claim 8, wherein gathering the requisite set of keywords from the associated column names across all columns is based on one or more filtering techniques when the number of the one or more columns is above a threshold number of columns.

11. The computer-implemented method of claim 8, wherein summarizing the one or more documents includes:
   extracting tags from the one or more documents that specify a domain of the one or more documents.

12. The computer-implemented method of claim 11, wherein summarizing the one or more documents further includes:
   performing a topic extraction, an extractive summarization, and an information retrieval action.

13. The computer-implemented method of claim 12, further comprising:
   tagging the structured data with a specific domain as based on the domain of the one or more documents.

14. The computer-implemented method of claim 13, further comprising:
   analyzing one or more datasets;
   identifying that at least one dataset of the one or more datasets is associated with the specific domain; and
   providing relevant code that manipulates the at least one dataset, wherein the relevant code manipulates the at least one dataset by processing the at least one dataset with a function associated with the specific domain.

15. A computer program product for automatically annotating structured data with domain specific tags comprising a computer readable storage medium having program instructions embodied therewith, the program instructions executable by a processor to cause the processor to perform operations, the operations comprising:

receiving structured data, wherein the structured data includes one or more columns and associated column names;

analyzing the structured data, wherein analyzing the structured data includes gathering a requisite set of keywords from the associated column names across all columns and/or a sample of column cells;

accessing a corpus of documents, wherein each of the documents in the corpus are associated with a respective keyword;

searching the corpus of documents based on one or more sub-keywords configured to narrow the searching of the corpus of documents, wherein the one or more sub-keywords are based on a search of the requisite set of keywords;

summarizing one or more documents, wherein summarizing the one or more documents includes mapping a knowledge graph and linked information pages associated with the requisite set of keywords; and classifying, based on the summarized one or more documents, the structured data with a specific domain.

16. The computer program product of claim 15, wherein the processor is further configured to perform operations comprising:

selecting the one or more documents in the corpus based on a respective keyword matching at least one requisite keyword from the requisite set of keywords.

17. The computer program product of claim 15, wherein gathering the requisite set of keywords from the associated column names across all columns is based on one or more filtering techniques when the number of the one or more columns is above a threshold number of columns.

18. The computer program product of claim 15, wherein summarizing the one or more documents includes:

extracting tags from the one or more documents that specify a domain of the one or more documents.

19. The computer program product of claim 18, wherein summarizing the one or more documents further includes:

performing a topic extraction, an extractive summarization, and an information retrieval action.

20. The computer program product of claim 19, wherein the processor is further configured to perform operations comprising:

tagging the structured data with a specific domain as based on the domain of the one or more documents.

* * * * *